United States Patent [19]
Suzuki et al.

[11] Patent Number: 4,976,188
[45] Date of Patent: Dec. 11, 1990

[54] BRAKE BOOSTER

[75] Inventors: Haruo Suzuki; Hiroya Gotoh, both of Saitama, Japan

[73] Assignee: Jidosha Kiki Co., Ltd., Tokyo, Japan

[21] Appl. No.: 413,877

[22] Filed: Sep. 28, 1989

[30] Foreign Application Priority Data

Oct. 24, 1988 [JP] Japan ................................ 63-267574

[51] Int. Cl.[5] .............................................. F15B 9/10
[52] U.S. Cl. ................. 91/369.2; 91/376 R; 92/48
[58] Field of Search ............... 92/48; 91/369.2, 369.4, 91/376 R

[56] References Cited

U.S. PATENT DOCUMENTS

| | | | |
|---|---|---|---|
| 4,309,935 | 1/1982 | Belart | 91/376 R |
| 4,330,996 | 5/1982 | Becht et al. | 91/376 R |
| 4,345,506 | 8/1982 | Ohomi | 91/376 R |
| 4,494,445 | 1/1985 | Furuta et al. | 91/376 R |
| 4,512,237 | 4/1985 | Endoh et al. | 91/369.2 |
| 4,516,474 | 5/1985 | Ochiai | 92/48 |
| 4,587,884 | 5/1986 | Tsubouchi | 91/376 R |
| 4,658,704 | 4/1987 | Mori et al. | 91/376 R |
| 4,718,326 | 1/1988 | Sugiura et al. | 92/48 |
| 4,738,186 | 4/1988 | Rossigno et al. | 91/376 R |
| 4,787,292 | 11/1988 | Tsuyuki et al. | 91/369.3 |
| 4,813,337 | 3/1989 | Endo | 91/376 R |

FOREIGN PATENT DOCUMENTS

| | | |
|---|---|---|
| 44-9770 | 5/1969 | Japan . |
| 53-23913 | 7/1978 | Japan . |
| 60-154952 | 8/1985 | Japan . |
| 62-91762 | 6/1987 | Japan . |

Primary Examiner—Ronald C. Capossela
Attorney, Agent, or Firm—Flynn, Thiel, Boutell & Tanis

[57] ABSTRACT

A brake booster includes at least two pairs of constant pressure chambers and variable pressure chambers defined within a shell. A clearance is defined between a stepped end face of a valve body which is disposed within the shell and a power piston which is mounted on the valve body at a location rearward of the stepped end face. The clearance is utilized to provide a communication between the constant pressure chambers, thereby allowing a reduction in the axial size of the valve body.

7 Claims, 2 Drawing Sheets

BRAKE BOOSTER

FIELD OF THE INVENTION

The invention relates to a brake booster including a constant pressure chamber and a variable pressure chamber disposed within a shell.

DESCRIPTION OF THE PRIOR ART

A tandem brake booster having two pairs of constant pressure chambers and variable pressure chambers disposed in seriatim within a shell is known in the art (see Japanese Patent Publications No. 9,770/1969 and No. 23,913/1978, Japanese Laid-Open Patent Application No. 154,952/1985 and Japanese Laid-Open Utility Model Application No. 91,762/1987).

The tandem brake booster comprises a plate fixedly disposed within a shell to divide the interior of the shell into a front chamber and a rear chamber, a valve body slidably extending through the plate, a seal member mounted on the plate for sealing the valve body against the plate, a front power piston and a rear power piston disposed in the front chamber and the rear chamber, respectively, and connected to the valve body, a front diaphragm and a rear diaphragm applied to the back side of each of the front and the rear power piston and acting to divide each of the front chamber and the rear chamber into a forwardly located, constant pressure chamber and a rearwardly located, variable pressure chamber, a constant pressure passage providing a communication between the constant pressure chambers, a variable pressure passage providing a communication between the variable pressure chambers, a valve mechanism contained within the valve body for switching a communication between the constant pressure passage and the variable pressure passage on one hand and a pressure passage which supplies a pressure fluid, and an input shaft mechanically coupled to a brake pedal to be driven for reciprocating motion, thereby switching a fluid path within the valve mechanism in accordance with its movement.

It is a common practice in the art that the constant pressure passage which communicates with the constant pressure chamber of the front chamber extends axially of the valve body and also communicates with the constant pressure chamber of the rear chamber through a radially extending bore formed therein at a given position. Accordingly, the seal member mounted on the rear plate is adapted to slide against the outer peripheral surface of the valve body on the front side of the bore while the rear power piston is connected to the valve body on the rear side of such bore. Accordingly, it will be seen that it is desirable to reduce the spacing between the front edge of the bore and the connection with the rear power piston as small as possible in order to reduce the axial size of the valve body. However, a given size is required of the bore in order to assure a given channel area. On the other hand, a given wall thickness is required of the valve body on the rear side of the bore since it is subject to an advancing force from the rear power piston. As a consequence, it has been difficult to achieve a further reduction in the axial size of the valve body with a conventional connecting structure.

SUMMARY OF THE INVENTION

In view of the foregoing, the invention provides a brake booster comprising a plate fixedly disposed within a shell to divide the interior of the shell into a front chamber and a rear chamber, a valve body slidably extending through the plate, a seal member mounted on the plate for sealing the valve body against the plate, a front power piston and a rear power piston disposed in the front chamber and the rear chamber, respectively, and connected to the valve body, a front diaphragm and a rear diaphragm applied to the back side of each of the front and the rear power piston and acting to divide each of the front chamber and the rear chamber into a forwardly located, constant pressure chamber and a rearwardly located, variable pressure chamber, a constant pressure passage providing a communication between the constant pressure chambers, a variable pressure passage providing a communication between the variable pressure chambers, a valve mechanism contained within the valve body for switching a communication between the constant pressure passage and the variable pressure passage on one hand and a pressure passage which supplies a pressure fluid, and an input shaft mechanically coupled to a brake pedal to be driven for reciprocating motion, thereby switching a fluid path within the valve mechanism in accordance with its movement.

In accordance with the invention, a stepped end face is formed on an outer peripheral surface of the valve body which is located within the rear chamber so as to exhibit a reduced diameter toward the rear end, and the seal member is disposed in sliding contact with the outer peripheral surface of the valve body on the front side of the stepped end face. The rear end of the constant pressure chamber opens into the stepped end face. The rear power piston is connected to the valve body on the rear side of the stepped end face and at a spacing therefrom while the rear end of the constant pressure chamber communicates with the rear constant pressure chamber through a clearance between the stepped end face and the rear power piston.

With this construction, the clearance between the stepped end face and the rear power piston corresponds to a bore provided in the prior art practice, without requiring a given wall thickness on the rear side of the bore and thus allowing a reduction in the axial size of the valve body by a corresponding amount. Since the rear power piston is connected to a portion of the valve body having a reduced diameter which is formed on the rear side of the stepped end face, a sufficient connecting strength can be secured.

Above and other objects, features and advantages of the invention will become apparent from the following description of several embodiments thereof with reference to the attached drawings.

DETAILED DESCRIPTION OF EMBODIMENTS

Figure 1:
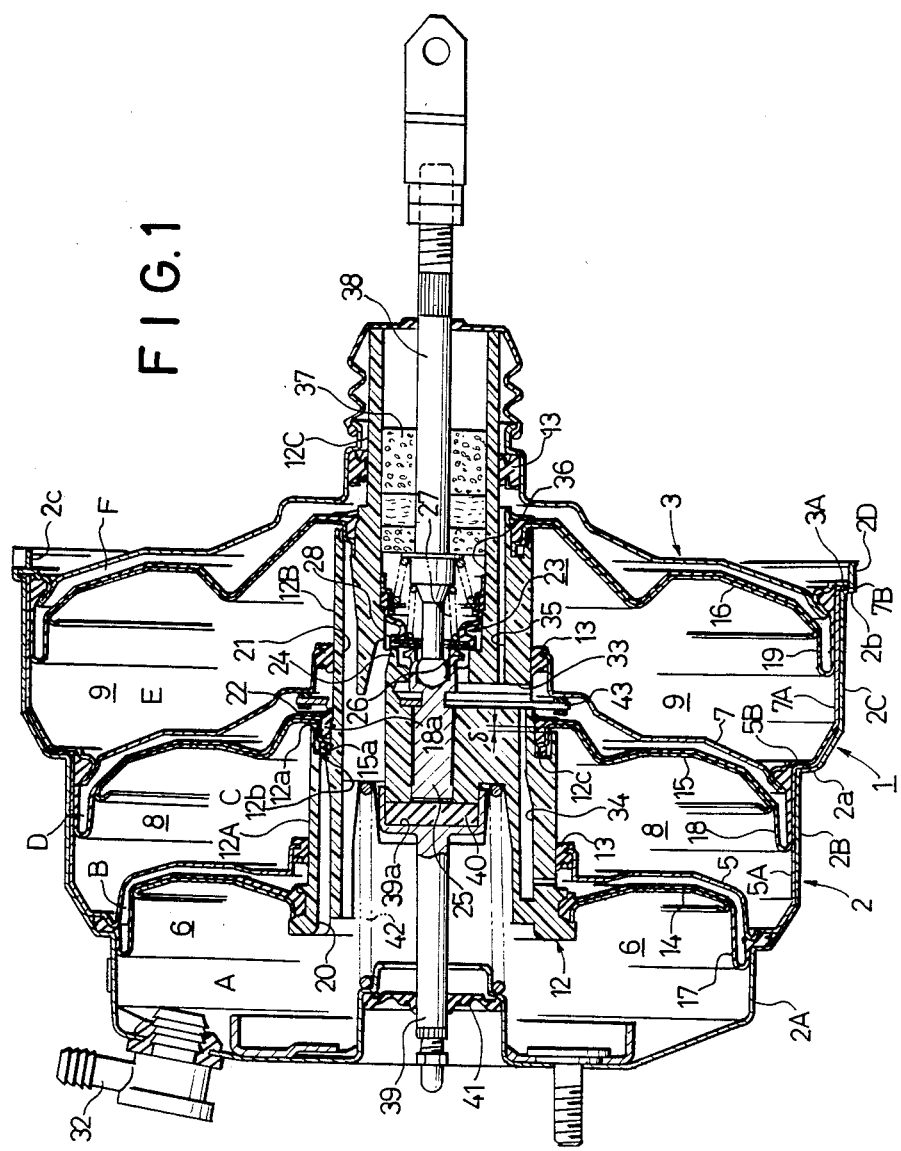
FIG. 1 is a side elevation, principally in longitudinal section, of one embodiment of the invention.

Referring to the drawings, and more particularly, to FIG. 1, there is shown a brake booster including a shell 1 which comprises a front shell 2 in the form of a stepped cup, and a substantially dish-shaped rear shell 3 which sealingly closes the opening of the front shell 2. The front shell 2 sequentially forms a reduced diameter portion 2A, an intermediate diameter portion 2B and an increased diameter portion 2C by successively increasing the diameter in a stepwise manner from its bottom to its opening, and the increased diameter portion 2C is formed with a cylindrical detent 2D of an even greater diameter toward its opening.

A front plate 5 in the form of a stepped cup is fitted inside the front shell 2, defining a front chamber 6 between the end wall of the front plate 5 and the corresponding end wall of the front shell 2. Specifically, the front plate 5 includes a cylindrical portion 5A which is a close fit inside the intermediate diameter portion 2B of the front shell 2, and a flange 5B formed on the right end of the cylindrical portion 5A and extending radially outward. The flange 5B is disposed in superimposed relationship with a stepped end face 2a formed in the intermediate diameter portion 2B of the front shell 2, thus positioning the front plate 5 with respect to the front shell 2.

A cup-shaped rear plate 7 is fitted inside the front plate 5, defining a center chamber 8 between the end wall of the rear plate 7 and the corresponding end wall of the front plate 5. The rear plate 7 includes a cylindrical portion 7A which is a close fit inside the increased diameter portion 2C of the front shell 2, and a flange 7B formed at the right end of the cylindrical portion 7A and extending radially outward. By disposing the flange 7B in superimposed relationship with a stepped end face 2b which is formed between the increased diameter portion 2C of the front shell and its cylindrical detent 2D, the rear plate 7 is positioned with respect to the front shell 2.

The rear shell 3 includes a flange 3A which is formed around its outer periphery and extending radially outward. The flange 3A is fitted inside the cylindrical detent 2D of the front shell 2 and is disposed in superimposed relationship with the flange 7B of the rear plate 7, thus defining a rear chamber 9 between the wall surface of the rear shell 3 and the corresponding end wall of the rear plate 7. Under this condition, part of the cylindrical detent 2D is bent to extend radially inward, thus forming a plurality of claws 2c, whereby the front shell 2, the front plate 5, the rear plate 7 and the rear shell 3 are mutually connected together in an integral manner.

A valve body 12 is slidably disposed in an axial region of the shell 1. As viewed from the front side toward the rear side, the outer periphery of the valve body 12 is sequentially formed with an increased diameter portion 12A, an intermediate diameter portion 12B and a reduced diameter portion 12C, each of which extends through openings formed in the respective plates 5, 7 and the rear shell 3 in axial alignment. Seal members 13 hermetically seal between the valve body 12 and the respective openings.

A front power piston 14, a center power piston 15 and a rear power piston 16 are disposed in the front chamber 6, the center chamber 8 and the rear chamber 9, respectively, and these power pistons 14 to 16 are connected to the valve body 12. A front diaphragm 17, a center diaphragm 18 and a rear diaphragm 19 are applied to the back side of the respective power pistons 14 to 16, thus dividing the interior of each chamber 6, 8 or 9 into a forwardly located, constant pressure chamber A, C or E and a rearwardly located, variable pressure chamber B, D or F.

A first constant pressure passage 20 extends axially through the valve body 12 for communicating the constant pressure chamber A of the front chamber 6 with the constant pressure chamber C of the center chamber 8, and a second constant pressure passage 21 also extends axially through the valve body 12 for communicating the constant pressure chamber A of the front chamber 6 with the constant pressure chamber E of the rear chamber 9.

The right end of the constant pressure passage 20 communicates with an annular groove 12b formed in the stepped end face 12a defined between the increased diameter portion 12A and the intermediate diameter portion 12B of the valve body 12. An axial portion of the center power piston 15 is formed with a stepped cylindrical portion 15a projects forwardly, with the tip having a reduced diameter of the cylindrical portion 15a being fitted around the inner peripheral surface of the annular groove 12b while simultaneously positioning it in abutment against the bottom of the annular groove 12b.

Accordingly, the passage 20 communicates with the annular groove 12b on the outside of the cylindrical portion 15a and also always communicates with the constant pressure chamber C of the center chamber 8 through a clearance δ defined between the stepped end face 12a of the valve body 12 and the center power piston 15. The outer peripheral surface of the annular groove 12b is formed with reinforcing ribs 12c which are spaced apart at a given spacing and which extend in the axial direction.

A bead 18a extending around the inner periphery of the center diaphragm 18 is fitted inside the stepped cylindrical portion 15a, thus preventing the passage 20 from communicating with the variable pressure chamber D. The bead 18a is prevented from being withdrawn from within the cylindrical portion 15a by a retainer 22 which is fitted around the valve body 12.

The right end of the other constant pressure passage 21 is constructed in substantially the same manner as the right end of the passage 20. Such construction enables a reduction in the axial size of the valve body 12.

If a radial bore of a size corresponding to the clearance δ opens into the valve body as is conventionally found in the art, with a center power piston corresponding to the piston 15 connected at a location to the rear side of the bore opening, a wall thickness is required of the valve body in a region located rearward of the bore so as to exhibit a sufficient strength to resist the advancing force which is applied thereto from the center power piston 15.

By contrast, with the described construction, the clearance δ defined between the stepped end face 12a and the center power piston 15 is equivalent to a conventional bore, and thus dispenses with an increased wall thickness on the rear side of the bore, thus allowing the axial size of the valve body to be reduced by a corresponding amount. Since the center power piston 15 is connected to a portion of the valve body having a reduced diameter which is located rearward of the stepped end face 12a, a sufficient strength of the connecting parts is assured.

In particular, when the power piston 15 is connected to the valve body 12 within the annular groove 12b which is formed in the stepped end face 12a as in the present embodiment, it is possible to cause the connecting parts to overlap the stroking of the seal member 13, enabling a further reduction in the axial size.

A valve mechanism 23 which is well known in itself is received within the valve body 12. The valve mechanism 23 comprises an annular, first valve seat 24 which is formed on the valve body 12, an annular, second valve seat 26 formed on the right end of a valve plunger 25 which is slidably disposed within the valve body 12, at a location radially inward of the first valve seat 24, and a valve element 28 adapted to be seated upon either valve seat 24 or 26 from the right under the resilience of a spring 27.

A space located radially outward of an annular seal defined by the contact between the first valve seat 24 and the valve element 28 communicates with the constant pressure chamber A of the front chamber 6 and the constant pressure chamber E of the rear chamber 9 through the second constant pressure passage 21 formed within the valve body 12. The chamber A communicates with a source of negative pressure such as an intake manifold, not shown, through a tubing 32 mounted on the front shell 2 for introducing a negative pressure. The negative pressure introduced into the chamber A is normally introduced into the constant pressure chamber C of the center chamber 8 and the constant pressure chamber E of the rear chamber 9 through the constant pressure passages 20, 21.

A space located radially inward of the annular seal defined by the contact between the first valve seat 24 and the valve element 28 and located outward of an annular seal defined by the contact between the second valve seat 26 and the valve element 28, or a space intermediate the both annular seals, communicates with the variable pressure chamber D of the center chamber 8 through a first variable pressure passage 33 which is formed to extend radially through the valve body 12. Both an axially extending, second variable pressure passage 34 which communicates with the variable pressure chamber B of the front chamber 6 and an axially extending, third variable pressure passage 35 which communicates with the variable pressure chamber F of the rear chamber 9 communicates with the valve mechanism 23 through the first variable pressure passage 33.

Accordingly, the individual variable pressure chambers B, D and F communicate with each other through the three variable pressure passages 33 to 35. The first variable pressure passage 33 communicating with the centrally located variable pressure chamber D has a minimum channel length, and the variable pressure passages 34 and 35 communicating with the variable pressure chambers B and F which are located on the opposite sides thereof extend in opposite directions therefrom, each assuming a substantially equal length. In other words, the variable pressure passages 33 to 35 allow the valve mechanism 23 to communicate with the individual variable pressure chambers B, D and F with minimum channel lengths.

As a consequence of this, if the variable pressure passage which provides a communication between the rear variable pressure chamber F and the valve mechanism 23 is designed to exhibit a minimum length, with the chamber F connected with the front variable pressure chamber B and the central variable pressure chamber D through respective variable pressure passages, the channel length between the chambers B and F will increase. By contrast, when the described arrangement is used, the channel length can be substantially halved, thus allowing a reduction in the channel resistance.

It is also to be noted that a space located radially inward of an annular seal defined by the contact between the the second valve seat 26 and the valve element 28 communicates with the atmosphere through an axially extending pressure passage 36 and a filter 37.

The plunger 25 which is slidably disposed within the valve body 12 has its right end connected to an input shaft 38 which is mechanically coupled to a brake pedal, not shown, while its left end is disposed in opposing relationship with the left end face of a reaction disc 40 which is received in a recess 39a formed in one end of a push rod 39. The left end of the push rod 39 slidably extends through a seal member 41 to the outside, projecting from an axial portion of the front shell 2, for connection with a piston of a master cylinder, not shown. It will be noted that the valve body 12 is normally held in its inoperative position shown by a return spring 42.

A key member 43 prevents the withdrawal of the valve plunger 25 from the valve body 12, and is displaceable in the axial direction of the valve body 12. Its opposite ends project through the outer peripheral surface of the valve body 12 so as to bear against the rear plate 7 when the brake booster is inoperative. Under this condition, the key member 43 restricts a free retracting movement of the valve plunger 25 with respect to the valve body 12, thus allowing the valve mechanism 23 to switch its flow path immediately upon depression of the brake pedal to drive the input shaft 38 to the left, thus reducing the loss stroke of the input shaft 38.

By arranging the key member 43 so that it bears against the rear plate 7 inside the shell 1, any sound of percussion produced upon abutment of the key member 43 against the rear plate 7 will be reduced when it is transmitted to the outside of the shell 1.

In the described arrangement, when the brake pedal is not depressed and the brake booster is inoperative, the return spring 42 maintains the valve body 12 at its right-hand, retracted position and the key member 43 bears against the rear plate 7 where it remains at rest. The key member 43 causes its engaging valve plunger 25 to advance relative to the valve body 12, so that whenever the input shaft 38 is driven to the left upon depression of the brake pedal, a flow path within the valve mechanism 23 can be switched immediately.

Under the inoperative condition mentioned above, the valve element 28 is seated upon the second valve seat 26 which is formed on the valve plunger 25 to close the pressure passage 36 which communicates with the atmosphere. Since the valve element 28 is slightly spaced from the first valve seat 24, the variable pressure passages 33 to 35 communicate with the constant pressure passage 21, whereby a negative pressure is introduced into all the chambers A to F within the shell 1.

If the brake pedal is now depressed to drive the input shaft 38 to the left, the valve element 28 will be immediately seated upon the first valve seat 24 while moving away from the second valve seat 26, whereby the communication previously established between the constant pressure passage 21 and the respective variable pressure passages 33 to 35 is interrupted or the communication between the constant pressure chambers A, C and E and the variable pressure chambers B, D and F is interrupted, and the atmosphere is introduced into the variable pressure chambers B, D and F. Thereupon, a pressure differential between the constant pressure chambers A, C and E and the variable pressure chambers B, D and F cause the power pistons 14 to 16 to be driven to the left integrally with the valve body 12, thereby driving the push rod 39 forward to cause a master cylinder, not shown, to generate a braking liquid pressure for braking action.

If the brake pedal is then released, the flow path within the valve mechanism 23 is switched to interrupt the communication between the variable pressure chambers B, D and F and the atmosphere while establishing a communication between the variable pressure chambers B, D and F and the constant pressure chambers A, C and E, whereby the atmosphere which is present in each of the variable pressure chambers B, D and F is vented to a source of negative pressure, not shown, through the constant pressure chamber A. At this time, since the individual variable pressure passages 33 to 35 establish a communication between the valve mechanism 23 and the individual variable pressure chambers B, D and F with minimum channel lengths, the atmosphere in the variable pressure chambers are allowed to be vented rapidly, thus preventing any retardation in terminating the operation of the brake booster.

Figure 2:
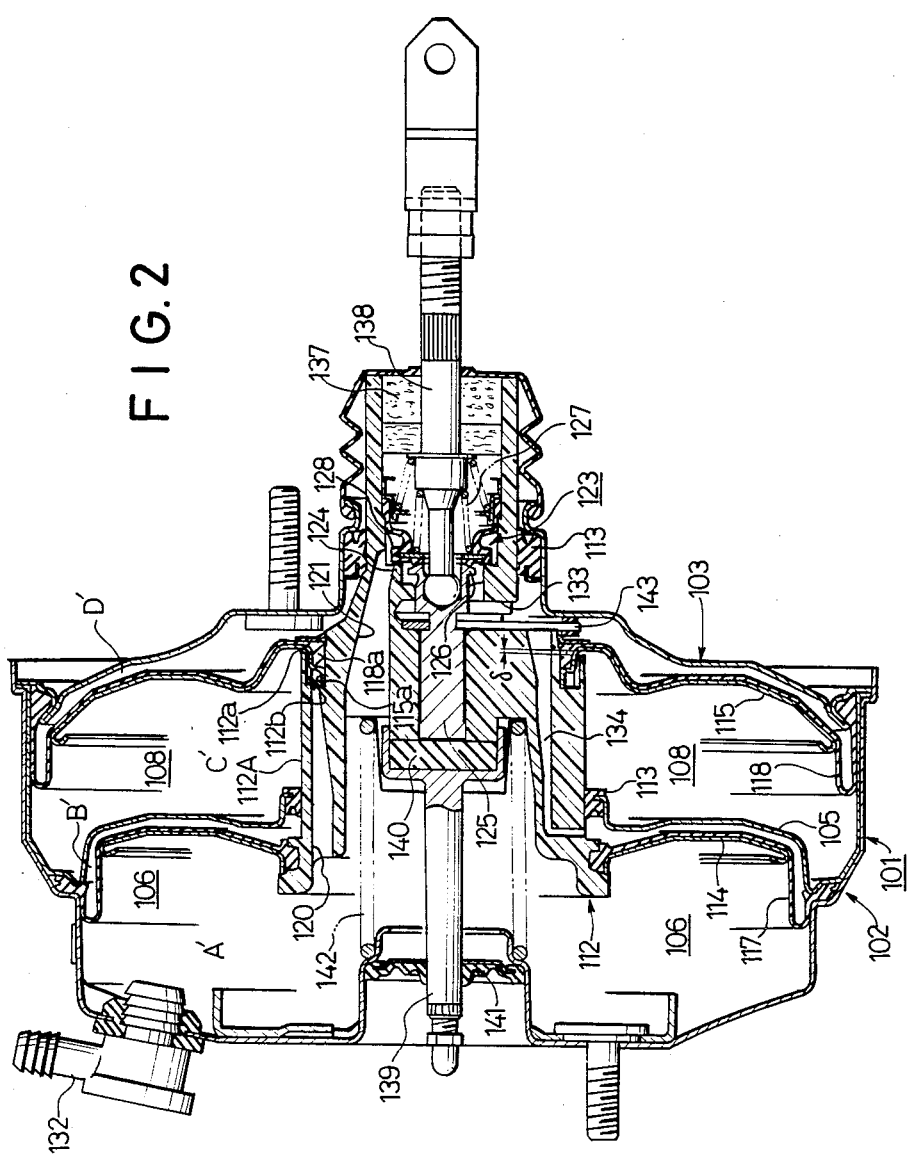
FIG. 2 is a similar view of another embodiment of the invention.

The embodiment described above represents the application of the present invention to a brake booster of triple type, but it should be understood that the invention is also applicable to a brake booster of tandem type which is known in the art, as illustrated in FIG. 2. However, the arrangement shown in FIG. 2 will not be specifically described, only to add that members corresponding to those shown in FIG. 1 are designated in FIG. 2 by like reference numerals, to which 100 is added and that chambers corresponding to the chambers A to D shown in FIG. 1 are designated by A', B', C' and D', respectively.

While the invention has been described above in connection with a preferred embodiment and a modification thereof, it should be understood that a number of changes, modifications and substitutions therein will readily occur to one skilled in the art from the above disclosure without departing from the spirit and scope of the invention.

What is claimed is:

1. A brake booster comprising a plate fixedly disposed within a shell to divide the interior of the shell into a front chamber and a rear chamber, a valve body slidably extending through the plate, a seal member mounted on the plate for sealing the valve body against the plate, a front power piston and a rear power piston disposed in the front chamber and the rear chamber, respectively, and connected to the valve body, a front diaphragm and a rear diaphragm applied to the back side of each of the front and the rear power piston and acting to divide each of the front chamber and the rear chamber into a forwardly located, constant pressure chamber and a rearwardly located, variable pressure chamber, a constant pressure passage providing a communication between the constant pressure chambers, a variable pressure passage providing a communication between the variable pressure chambers, a valve mechanism contained within the valve body for switching a communication between the constant pressure passage and the variable pressure passage on one hand and a pressure passage which supplies a pressure fluid, and an input shaft mechanically coupled to a brake pedal to be driven for reciprocating motion, thereby switching a fluid path within the valve mechanism in accordance with its movement;

characterized in that a stepped end face is formed on the outer peripheral surface of the valve body at a location which is within the rear chamber so as to exhibit a reduced diameter toward its rear end, and in which the seal member is disposed in sliding contact with the outer peripheral surface of the valve body at a location located forwardly of the stepped end face, the rear end of the constant pressure passage opening into the stepped end face, the rear power piston being connected to the valve body at a location rearward of the stepped end face and at a spacing from the stepped end face, the rear end of the constant pressure passage communicating with the rear constant pressure chamber through a clearance between the stepped end face and the rear power piston.

2. A brake booster according to claim 1 in which the stepped end face of the valve body is formed with an annular groove which communicates with the constant pressure passage, and in which the rear power piston is formed with a cylindrical portion in its axial portion which projects forwardly, the tip of the cylindrical portion being fitted around the inner peripheral surface of the annular groove and is also disposed in abutment against the bottom of the annular groove.

3. A brake booster according to claim 2 in which the outer peripheral surface of the annular groove is formed with an axially extending rib at a given circumferential position.

4. A brake booster according to claim 2 in which the cylindrical portion of the rear power piston is formed as a stepped cylindrical portion having a reduced diameter at its front side, a bead extending around the inner periphery of the rear diaphragm being fitted into an increased diameter portion of the stepped cylindrical portion, thereby preventing the constant pressure passage from communicating with the rear variable pressure chamber.

5. A brake booster according to claim 4 in which a retainer fitted around the outer periphery of the valve body is effective to prevent the withdrawal of the bead extending around the inner periphery of the diaphragm.

6. A brake booster according to claim 1 in which the brake booster is of a tandem type.

7. A brake booster according to claim 1 in which the brake booster is of a triple type.

* * * * *